Jan. 8, 1935. J. M. WEAVER 1,986,952

INSULATING COVERING FOR PIPES

Filed July 17, 1931

INVENTOR
Jesse M. Weaver
BY ATTORNEYS

Patented Jan. 8, 1935

1,986,952

UNITED STATES PATENT OFFICE 1,986,952

INSULATING COVERING FOR PIPES

Jesse M. Weaver, Charleston, S. C., assignor to Raybestos Manhattan, Inc., Passaic, N. J., a corporation of New Jersey Application July 17, 1931, Serial No. 551,329

2 Claims. (Cl. 154—44)

This invention relates to a heat insulating covering for pipes and tubing.

The invention is particularly designed to be applied to readily bendable metallic pipes or tubing, such as is now being used in hot water and low pressure steam heating systems. The invention is not limited, however, to such an application thereof, but it may be applied with advantage generally to pipes or tubing to insu'ate the same against heat transmission. Readily bendable metallic tubing, such as referred to above, may be installed in relatively long runs without the use of unions or fittings. In such installations the tubing is bent about obstructions and is also bent to locate adjacent connected lengths of the tubing in the required angular positions.

Installations in which the ordinary rigid metallic pipes are used consist of a number of straight lengths of pipe connected by unions or fittings into which the threaded ends of said lengths are screwed. The insulation for rigid pipes of this character usually consists of cyindrical sections of insulating material split longitudinally to enable the same to be placed over a pipe. These sections are applied after the pipe is installed. The joints between the lengths of the pipe are usually covered with some form of insulating paste or cement. Installations in which the ordinary rigid pipes are used have a large number of joints which it is necessary to cover with insulating cement. The usual insulation cannot be applied to cover the joints in bent tubing since the sections of such insulation are inflexible in directions transverse to the axes thereof.

The installation of insulation of the character above described ordinarily used upon rigid pipes requires a great deal of labor and time and is, therefore, relatively expensive to use. Each of the sections of insulation must be opened up in placing the same over the pipe and, after being closed upon the pipe, must be secured in closed position. This is usually done by wrapping canvas jackets about the sections and by securing metallic bands about the ends of the sections outside of the jackets. In applying insulation of this type to pipes or tubing, it is ordinarily necessary to do a considerable amount of cutting and fitting to make the insulation fit straight portions of the pipe of different lengths. The application of the paste or cement at the joints also requires a considerable amount of labor and time.

Certain objects of the present invention are to improve the construction of heat insulation for pipes and tubing and to produce an insulation which will avoid certain disadvantages, above pointed out, in the present constructions.

Another object of the invention is to produce an insulating covering for pipes and tubing which may be applied with equal facility either to straight portions of the tubing or bends therein and may be quickly and easily fitted to tubing sections of different lengths.

With these and other objects inview, in accordance with certain features of the invention, an insulation for pipes and tubing has been produced which will readily flex to accommodate angular bends in the tubing and which is axially compressible and resilient.

In its preferred form the invention consists in an insulating mass comprising a roving of insulating fibre wound in a mass having a large number of voids or spaces, and having a central pipe receiving opening. The roving itself, consisting of a loosely twisted yarn of the insulating fibre, contains a relatively large amount of air between the fibres. The manner in which the roving is wound also provides a relatively large number of air spaces within the mass. The air thus held entrapped within the mass greatly enhances the heat insulating effect.

The above and other novel and improved features of the invention will be clearly understood from the accompanying drawings illustrating the invention in its preferred form and the following detailed description of the construction therein shown.

In the drawing—

In the form of the invention illustrated in this application, the insulation is made in sections adapted to be separately applied to a pipe. Each of these sections, indicated at 2, consists of a cylindrical mass of fibrous insulating material having an axial opening to receive a pipe. These cylindrical masses are "strung" on a pipe in end to end relation so that they surround and insulate the entire length of the pipe or any desired portion thereof.

Figure 1:
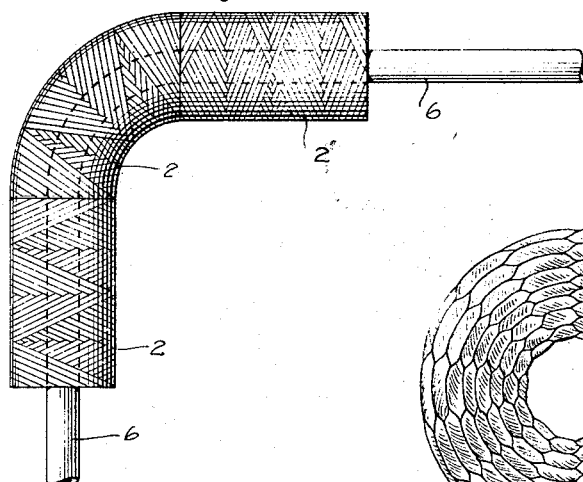
Fig. 1 is a view in side elevation illustrating several masses or sections of insulation embodying the invention applied to a pipe.
Figure 2:
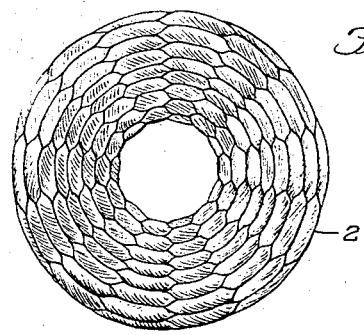
Fig. 2 is a view in end elevation illustrating one of the sections of insulation.
Figure 3:
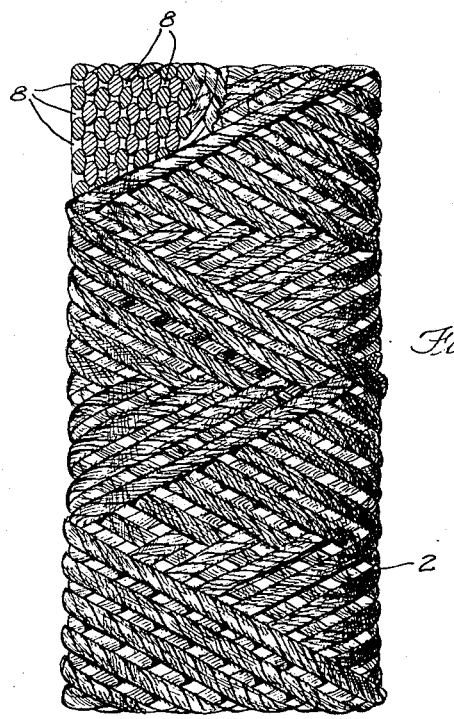
Fig. 3 is a view in side elevation, partly in section illustrating one of said sections of insulation.
Figure 4:
Fig. 4 is a view in elevation, illustrating the roving, from which the insulation is formed.

In Fig. 1 a number of the sections 2 are shown as strung upon the pipe 6 with the ends of the sections in abutting relation. The central section is shown as flexed in a direction transverse to the axis thereof to cover a bend in the pipe.

Each of the cylindrical masses or sections of insulations 2 is made from a roving 4 of insulating fibrous material. This roving may be made of various materials. Preferably, however, the roving consists of asbestos fibres loosely twisted into a yarn. This yarn, because of its loose formation, contains a relatively large quantity of air between the fibres. The yarn is wound into a cylindrical mass containing a large number of voids or spaces 8 between the turns of the roving. As shown in the drawing, the roving is wound in a mass by a method known in the winding art as the "Fiji" wind. In this method the roving, as it is wound upon a mandrel, is guided back and forth axially of the mandrel. This will result in winding the roving into a cylindrical mass about the mandrel. The portions of each turn of the roving approaching and receding from the end of the cylindrical mass are laid at definite angles to each other. The rotation of the mandrel and the reciprocating movement of the roving guide are so correlated that each turn is laid over the preceding turn adjacent the angle in the preceding turn at the end of the cylindrical mass so as to hold the preceding turn in place.

The roving may be wound in other ways to provide the desired number of voids of spaces and to give the mass the desired longitudinal compressibility and resilience and axial flexibility.

The roving is wound preferably on a cylindrical support such as a mandrel of a size to correspond with the size of the pipe to which the cylindrical masses are to be applied and when completely wound, the cylindrical masses are removed from the mandrel. It is important to prevent the roving at the inner portion of the wound mass from collapsing into the central passage or opening when the mass is removed from the mandrel, since this might seriously interfere with the application of the mass to a pipe. To this end, after the first layer of roving is wound on the mandrel, a suitable cement or paste such as "water glass" is applied to this layer and the winding is then continued over this layer until the desired thickness is reached. When the wound mass is removed from the mandrel, the inner layer is held from collapsing into the central passage by the paste or cement which holds the same to the surrounding layer.

In the use of the sections or masses of insulation above described, these sections are strung on the pipes to be insulated in the manner illustrated in Fig. 1. The number of sections required to cover the pipe are applied thereto before the pipe is secured in position.

It is often desirable to apply the insulation to a length of pipe and then to connect the end of the pipe with another pipe by a suitable union or fitting. The longitudinal compressibility and resilience of the sections of insulation enables the number of sections required to cover the entire length of the pipe to be applied to the pipe and the end section then to be pushed back away from the end of the pipe to facilitate the attachment of the union or fitting thereto. After the attachment of the fitting, the resilience of the sections will tend to restore the sections to positions to cover the entire length of the pipe. The sections may each be drawn out or extended axially to a certain degree, if required to accomplish this result. The longitudinal compressibility of the sections enables the varying lengths of pipes or tubing between fittings readily to be completely covered by the insulation.

The present insulation has the advantage that it may be much more quickly and easily installed than the insulation that has heretofore ordinarily been employed on pipes for the circulation of a heating medium. The present insulation may be applied to a pipe merely by slipping the same endwise over the pipe and the sections thereof will flex sufficiently to pass over the bends in the pipe and to cover the bends. Thus each section may be installed with much less labor and time than the sections of the ordinary insulation and there is no necessity of covering the bends in the pipe with cement as is ordinarily done. Furthermore, there are no cracks between the sections to be filled with cement.

The cement or paste which secures the layer of the roving immediately outside of the central opening to the surrounding layer gives some degree of firmness to the insulating covering and enables the sections to be shipped without crushing. The amount of paste or cementing material used, however, is not sufficient to destroy the flexibility or compressibility of the sections.

The insulation described above is well adapted for use upon pipe concealed in walls or floors. The insulation can be given a finished appearance by the application of a suitable outer covering thereto after the required number of sections have been located in position to insulate any length of pipe. For example, the insulation may be finished by the application of a layer of red rosin paper immediately over the insulation and by the application of a canvas jacket upon the outside of the paper, this jacket preferably being sewed in place.

It is to be understood that the invention is not limited to the specific construction illustrated in this application, but that certain features thereof may be embodied in other forms within the scope of the claims.

Having explained the nature and object of the invention and having specifically described a construction embodying the invention in its preferred form, what is claimed is:

1. A heat insulating covering for tubes and pipes made up of a series of relatively short sections each comprising one or more loosely twisted strands of fibrous insulating material wound in a series of layers to form a loose fibrous self-sustaining mass and containing a large number of voids each section having a central opening adapting each section independently to be slipped onto the pipe to be insulated.

2. A relatively short heat insulating section for tubes and pipes comprising one or more rovings of fibrous insulating material wound in a number of turns, certain of which lie in side by side relation and certain of which are superposed to form a loose compressible fibrous self-sustaining mass containing a relatively large amount of air space and having a central opening adapting it to be slipped longitudinally onto the pipe to be insulated.

JESSE M. WEAVER.